United States Patent [19]

Tateyama

[11] Patent Number: 4,733,913
[45] Date of Patent: Mar. 29, 1988

[54] HEADREST

[75] Inventor: Tomoyoshi Tateyama, Yamato, Japan

[73] Assignees: Ikeda Bussan Co., Ltd., Ayase; Ikeda Kinzokukogyo Co., Ltd., Yamato, both of Japan

[21] Appl. No.: 807,601

[22] Filed: Dec. 11, 1985

[30] Foreign Application Priority Data

Dec. 12, 1984 [JP] Japan .......................... 59-188437[U]

[51] Int. Cl.⁴ .............................................. A47C 7/38
[52] U.S. Cl. .................................... 297/409; 297/356; 297/391
[58] Field of Search ................ 297/408, 409, 391, 356

[56] References Cited

U.S. PATENT DOCUMENTS

| | | | |
|---|---|---|---|
| 979,149 | 12/1910 | Gay | 297/356 |
| 2,812,802 | 11/1957 | Gielow | 297/408 X |
| 2,828,810 | 4/1958 | Barecki et al. | 297/408 X |
| 4,304,439 | 12/1981 | Terada et al. | 297/409 |
| 4,307,913 | 12/1981 | Spiegelhoff | 297/417 |
| 4,370,898 | 2/1983 | Maruyama | 297/408 |
| 4,558,903 | 12/1985 | Takagi | 297/408 |

Primary Examiner—Francis K. Zugel
Attorney, Agent, or Firm—Schwartz, Jeffery, Schwaab, Mack, Blumenthal & Evans

[57] ABSTRACT

A headrest whose position can be adjusted by moving its body forward and backward in relation to a support stay comprising the headrest body located above the support stay which is planted in the upper portion of the seat back of a seat, a support means located between the headrest body and the support stay to support the headrest body movable in relation to the support stay, a lock mechanism located between the support stay and the support means to freely swing the support means, corresponding to the movement of the headrest body in a direction, but limit the swinging movement of the support means against the movement of the headrest in another direction, and a lock release mechanism for releasing the lock mechanism when the headrest body is at the stop end of its moving stroke.

7 Claims, 6 Drawing Figures

FIG. I

HEADREST

BACKGROUND OF THE INVENTION

1. Field of the Invention

The present invention relates to a headrest wherein the headrest can be moved forward and backward in relation to a support stay to adjust its position.

2. Description of the Prior Art

Various kinds of headrests which enable their position to be adjusted have been proposed these days, but almost all of them are intended to manually operate them by the knob, lever or the like, while the others which have no means such as the knob are intended to adjust their position by grasping them by a hand and moving them to a desired position.

One of the headrest of the latter type is shown in FIG. 1, which is intended to adjust its position by controlling its inclination and includes a locking device for preventing return action. In this figure, numeral 1 denotes a support means which is mounted on one end of a support stay 2. The other end of the support stay 2 is inserted in a hole provided at the upper portion of a seat back 3 and fixed thereto. The support means 1 is rotatably provided with a headrest frame or movable member 5 through a pivot shaft 4 so as to incline a headrest body 20 about the pivot shaft 4. Movable member 5 is provided with a member 6 which has a plurality of teeth 7 continuously formed along an arc the center of which is the same as that of said pivot shaft 4, land section 8 provided at one end of said teeth 7, and stopper portion 9 disposed at the end of said land section 8. Support member 1 pivotally supports a pawl means 11 through a pin 10 which can be engaged with one of said teeth 7 selectively. Said teeth 7 and paw means 11 construct a device for locking the returning movement of a headrest body 20 in relation to the support stay 2. Further, the support member 1 pivotally supports a hook 13 which can be engaged with a hanger portion 14 provided at the end of the pawl means 11 for holding said pawl means 11 in the condition of being released from the teeth 7. The pawl means 11 is operatively connected with the hook 13 through a coil spring 15 which acts for rotating both of said means 11 and 13 in anti-clockwise direction (shown by an arrow in FIG. 1) respectively. The pawl means 11 can be engaged with one of the teeth by the action of said coil spring 15. The hook 13 is biased by the coil spring 15 so as to be engaged with the pawl means 11, wherein said hook 13 is engaged with the hanger portion 14 when the pawl means 11 moves in relation to the teeth 7 and reaches on the land section 8. On the movable member 5, a projecting wall 16 is provided at the position corresponding to the hook 13. Said projecting wall 16 collides with the hook 13 and acts to release the engagement between the pawl means 11 and hook 13 against the function of the coil spring 15 when said pawl means 11 is engaged with the tooth 7 arranged at left end as shown in FIG. 1. Further, support means 1 and movable member 5 are operatively connected with each other through a coil spring 17. Said coil spring 17 functions so as to rotate the movable member 5 about the pivot shaft 4 in clock-wise direction in FIG. 1.

However, in the case of such conventional headrest, the headrest body 20 rotatably mounted on the suppot stay 2 is inclined forward and backward so as to adjust the front and rear positions thereof. Therefore, a sufficient stroke for moving the headrest forward and backward cannot be obtained, and most of the passengers cannot be satisfied. And, the mechanism for controlling the rotation and return movement of the headrest is somewhat too complicated, thereby making the cost high and its durability doubtful.

Further, in the case of the conventional headrests which are operated by the knob or the like make it necessary to attach or project the knob to or from them. Therefore, their design is limited to some extent and their shape becomes complicated, thereby making their cost high and their safety retarded by the knob projected. On the other hand, the otheres which have no means such as the knob are likely to become complicated in construction, thereby making their cost high, and their durability doubtful.

SUMMARY OF THE INVENTION

The present invention is therefore intended to eliminate the above-mentioned drawbacks.

A first object of the present invention is to provide a headrest which can be moved forward and backward, without using any projected means such as the knob, to adjust its position.

A second object of the present invention is to provide a headrest whose position can be adjusted only by grasping its head portion by a hand and forcing it forward and backward.

A third object of the present invention is to provide a headrest in which a position adjusting mechanism, simple in construction and easy to assembly, is incorporated.

For the purpose of achieving these and other objects of the present invention, a pair of link members are swingably attached to the upper end of a support stay planted in the seat back, while a base frame is fixedly arranged in the hollow body of a headrest and the front end of each of the paired swingable link members is pivoted on the base frame, so that a link mechanism can be formed as a swingable support means fo enabling the headrest to be moved forward and backward. Arranged betwen the support stay and the swingable support means is a lock mechanism for allowing the swingable support means to be freely swung, corresponding to the movement (or forward movement, for example) of the headrest body in one direction, and limiting the swinging movement of the swingable support means against the movement of the headrest body in another direction. This lock mechanism is attached to one of the paired swingable link members, taking the pivot shaft of this link member for its rotation center, and a click member movably attached to the support stay or headrest body and having a click engageable with the teeth of the sector. A lock release member for the lock mechanism is provided to release the lock of the lock mechanism when the headrest body is moved to a predetermined position.

According to the headrest arranged as described above, the headrest body can be grasped by a hand and moved form the start end of its moving stroke to the stop end thereof by the action of the link mechanism. When it is moved, the engaging relation between the teeth of the sector and the click of the click member is changed and when it is released from the hand at a desired position, the click of the click member is engaged with that tooth of the sector which corresponds to the desired position, thereby stopping it from returning in its start end direction. When it is moved to the stop end of its moving stroke, the click member is released from any of the teeth of the sector, leaving it released. When it is returned under this state to the start end of its moving stroke, the click of the click member is engaged with one of the teeth of the sector, thereby keeping it under initial state.

According to the headrest of the present invnetion as described above, the position of the headrest body can be adjusted without using the knob, lever or the like. It is therefore unnecessary to provide any additional means outside the headrest body, thereby making the headrest body simpler in construction. In addition, the position of the headrest body can be adjusted by the machanism which consists of as few parts as possible, thereby making the cost lower.

These and other objects as well as merits of the present invention will become apparent from the following detailed description with reference to the accompanying drawings.

DETAILED DESCRIPTION OF THE PREFERRED EMBODIMENT

Figure 1:
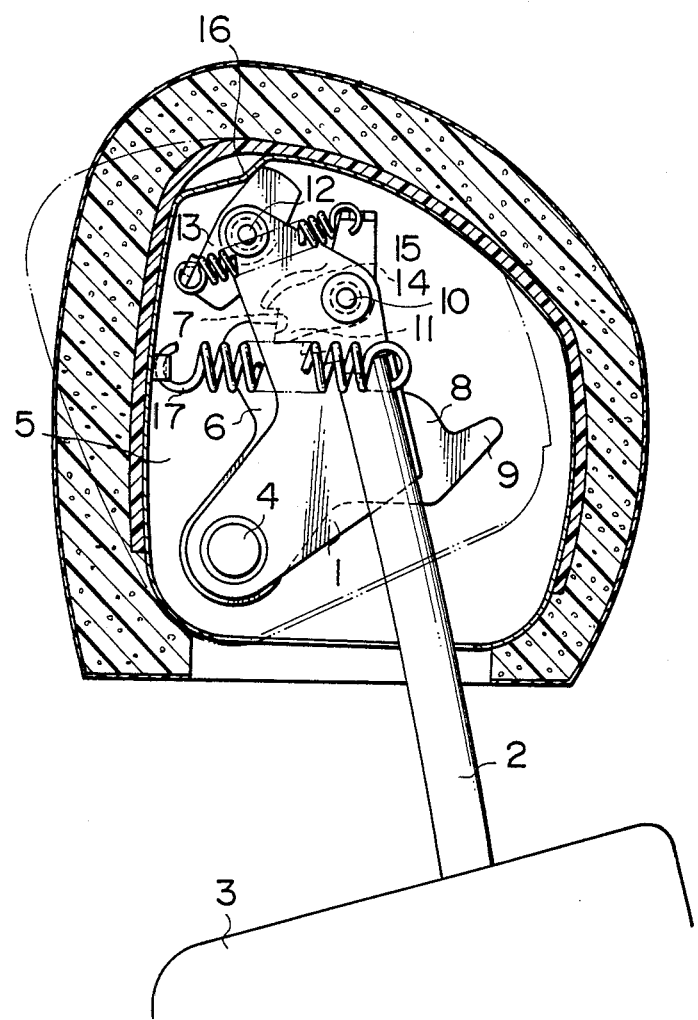
FIG. 1 is a sectional view showing a conventional headrest which can be moved forward and backward in relation to a support stay.
Figure 2:
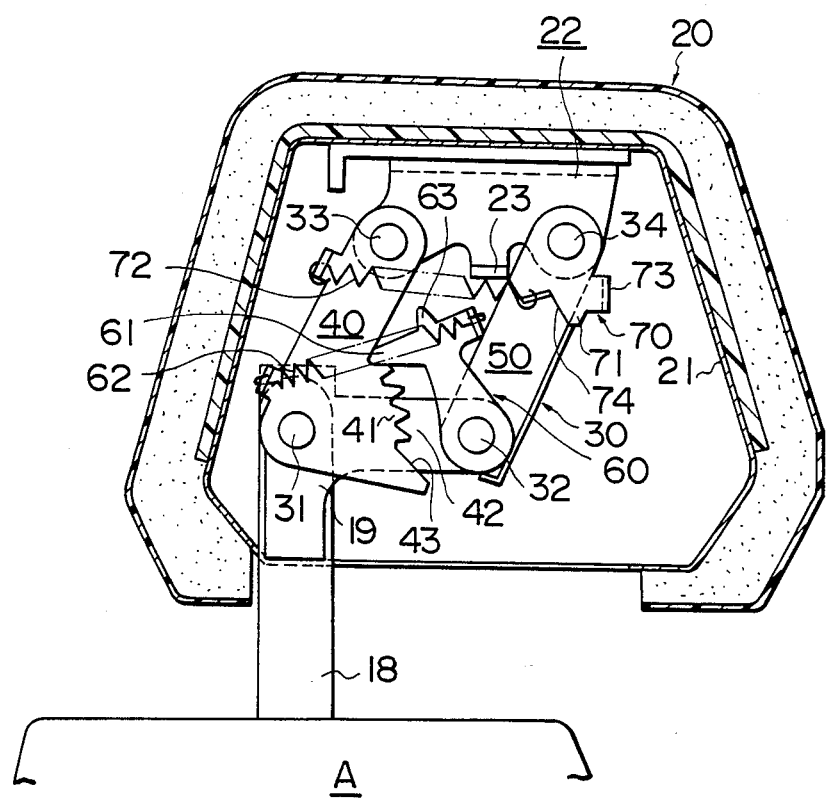
FIG. 2 is a sectional view showing an embodiment of the present invention.

FIG. 2 shows an embodiment of the present invention. A support bracket 19 is fixed the upper end portion of a support stay 18 erected from the seat back of a seat A. A headrest body 20 is supported, movable forward and backward, by the support bracket 19 through a link mechanism 30.

The headrest body 20 comprises covering a headrest frame 21 with pad or the like and both of the headrest body 20 and frame 21 are supported, movable forward and backward, on the support stay 18 through the support bracket 19 and link mechanism 30.

The link mechanism 30 comprises the support bracket 19 a first swing link member 40 whose base is pivoted on the front portion of the support bracket 19 through a pivot shaft 31, a second swing link member 50 whose base is pivoted on the back portion of the support bracket 19 through a pivot shaft 32, and a bracket 22 fixed to the headrest frame 21 and on which the front ends of the first and second swing link members 40 and 50 erected in parallel from the support bracket 19 are pivoted through pivot shafts 33 and 34, respectively. When the first swing link member 40 is arranged parallel to the second swing link member 50, the link mechanism 30 is called parallel link mechanism, but it is not necessarily needed that the first and second swing link members 40 and 50 are arranged like this.

The headrest body 20 is urged in right direction in FIG. 2 by means of a spring (not shown).

A sector 41 is located at the base of the first swing link member 40 and teeth 42 are formed on one side of the sector 41, taking the pivot shaft 31 as their center.

Pivoted on the support bracket 19 which supports the first swing link member 40 through the pivot shaft 31, is a click member 60 through the pivot shaft 32. These sector 41 and click member 60 form a lock mechanism.

The click member 60 has a click 61 which can get over the teeth 42 of the sector 41 not in a direction but in the reverse direction thereof. The click 61 is urged by a spring 62 to engage the teeth 42 of the sector 41.

The sector 41 has a pushing portion 43 continuous from its last tooth and contacted with the click 61 of the click member 60 to release the click 61 from the teeth 42 of the sector 41 when the headrest body 20 is moved to the stop end of its moving stroke. Namely, the pushing position 43 of the sector 41 serves as a release member for swinging the click member 60 to release the click 61 from the teeth 42 of the sector 41.

A pole member 70 is pivoted on the second swing link member 50 through the pivot shaft 34 and serves as a holder means for holding the click 64 of the click member 60 released from the teeth 42 of the sector 41 when the headrest body 20 is moved to the stop end of its moving stroke. The release member and holder means form a lock release mechanism.

The pole member 70 has an engaging end 71 engageable with an engaged end 63 of the click member 60 and urged by a spring 72 in clockwise direction in which a stopper 73 is contacted with a part of the second swing link member 50. The engaging end 71 has a side 74 engaged with and released from the end 63 of the click member 60.

A returning means 23 is erected on the bracket 22 fixed to the headrest frame 21 and serves to engage the side 74 to release the pole member 70 when the headrest body 20 which has released at the stop end of its moving stroke is returned to the start end or its initial position.

Figure 3:
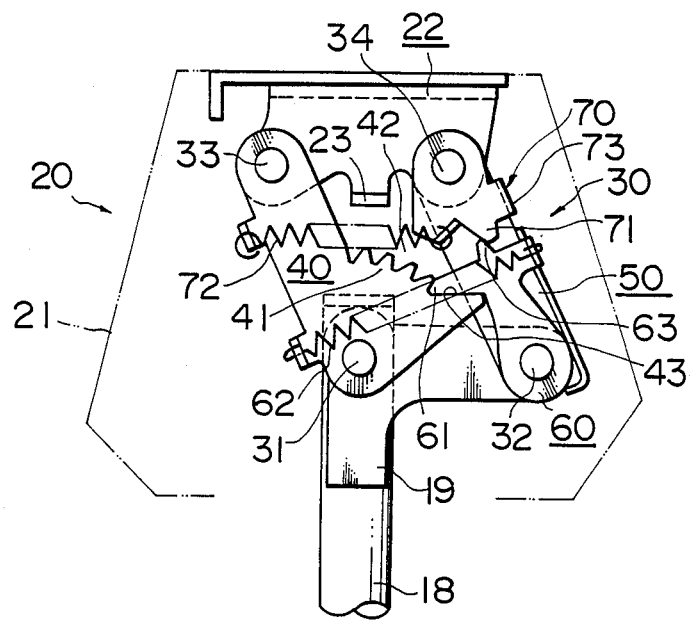
FIG. 3 shows a click of a click member engaged with the last tooth of a sector.

In FIG. 2, the headrest body 20 and frame 21 are at the start end of their moving stroke, and the click 61 of the click member 60 is engaged with the start end of the teeth 42 of the sector 41 to prevent both of the headrest frame 21 and body 20 from moving in right direction in FIG. 3. The headrest body and frame are stopped like this whichever teeth of the sector 41 the click 61 may be engaged with.

In the case where the position of the headrest body 20 is to be adjusted, the headrest body 20 is grasped by a hand and force is applied to the headrest body 20 to move it in left direction in FIG. 3. The link mechanism 30 is thus made operative, following the movement of the headrest body 20 and frame 21, to swing the first swing link member 40 and sector 41. When the force applied is stronger than a predetermined one, the click 61 of the click member 60 rides on the side of a tooth and then gets over the tooth. The click 61 of the click member 60 gets over the succeeding teeth one after another like this.

When the headrest body 20 is released from the hand at a desired position, the click 61 of the click member 60 is engaged with that tooth of the sector 41 which corresponds to the desired position, to stop the headrest frame 21 and body 20, so that the position of the headrest body 20 can be adjusted.

When the headrest body 20 is released, passing over the desired position, it is largely moved in left direction in FIG. 2. The click member 60 is thus swung, causing its click 61 to be passed over the last end of the teeth 42 and contacted with the pushing portion 43, as shown in FIG. 3, and then released from the teeth 42, as shown in FIG. 4.

The end 63 of the click member 60 is contacted with the engaging end 71 of the pole member 70 almost at the same time and gotten over the engaging end 71, swinging the pole member 70 in anti-clockwise direction.

Figure 4:
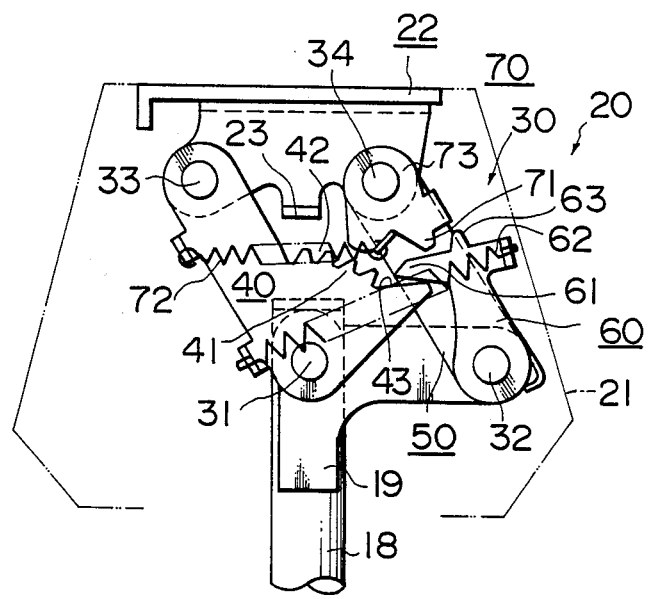
FIG. 4 shows the click of the click member riding on the contact portion of the sector and an engaged end of the click member over the engaging end of a pole member.
Figure 5:
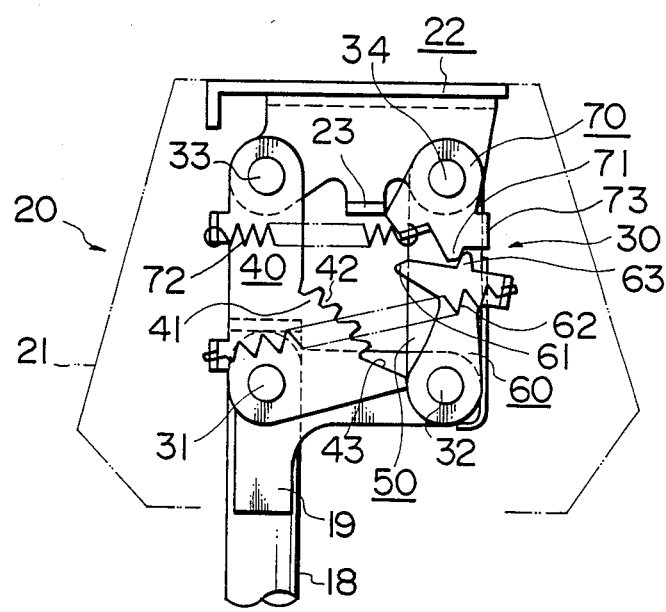
FIG. 5 shows the click member released from the sector, under which headrest body and frame are being returned to their initial states, with the engaged end of the click member over the engaging end of the pole member.
Figure 6:
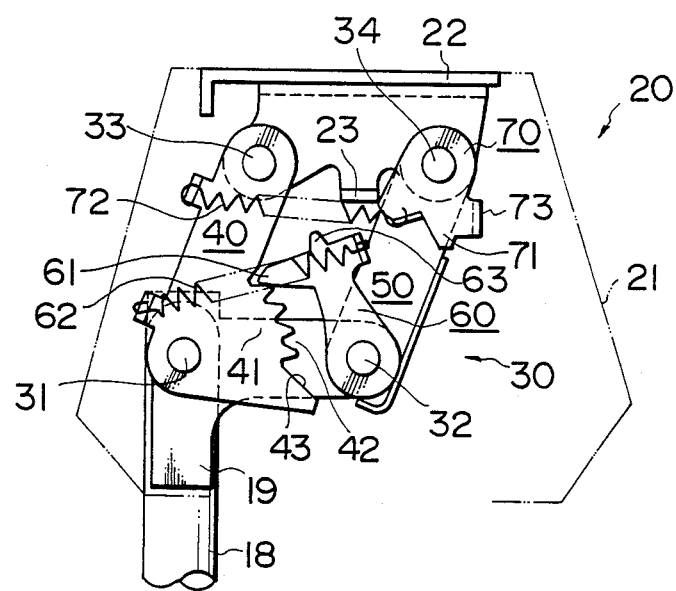
FIG. 6 shows the headrest body and frame returned and the click member released from the pole member.

When the headrest body 20 and frame 21 are then moved in left direction from their positions shown in FIG. 4, the engaged end 63 is again engaged with the engaging end 71 of the pole member 70, as shown in FIG. 5, to hold the click 61 of the click member 60 released from the teeth 42 of the sector 41, so that both of the headrest body 20 and frame 21 can be returned to the start end of their moving stroke (FIG. 5).

When the headrest body 20 and frame 21 are returned to the start end of their moving stroke, the returning means 23 on the bracket 22 fixed to the headrest frame 21 is contacted with the side 74 to swing the pole member 70 in anti-clockwise direction. As the result, the end 63 of the click member 60 is released from the engaging end 71 of the pole member 70, while its click 61 is engaged with the start end of the teeth 42 of the sector 41 due to the action of the spring 62, thereby causing the headrest body 20 to be returned as shown in FIG. 2.

When the headrest 20 and frame 21 are again moved in left direction in FIG. 3, the position of the headrest body 20 can be adjusted as described above.

The mechanism for holding the headrest body by means of the sector, click member, pole member and the like may be arranged, taking any of the pivot shafts 31–34 as its center, and these members may be attached to those members, which form the link mechanism, to achieve the abovedescribed function.

Although one embodiment of the present invention has been described, it should be understood that various modifications can be made without departing from the scope and spirit of the present invention.

What is claimed is:

1. A headrest whose position can be adjusted by moving its body forward and rearward in a horizontal plane in relation to a seat back of a seat comprising:
   a support stay in an upper portion of the seat back of the seat;
   a headrest body located at an upper portion of the support stay;
   a link mechanism including a first forward swing link member and a second rear swing link member located between the headrest body and a support means for supporting the headrest body swingably in relation to the support stay;
   a lock mechanism located inside the headrest body, between the support stay and the support means for allowing said support means to freely swing in accordance with movement of the headrest body in one direction and to limit swinging movement of the support means against movement in another direction of the headrest body, said lock mechanism including a sector having a plurality of teeth provided on one of the swing link members, said lock mechanism utilizing a pivot shaft of the attached swing link member for its rotation center, and a click member movably attached to one of the support stay and headrest body, the click member having a click engageable with the teeth of the sector;
   a lock release mechanism for releasing the lock mechanism when the headrest body is at a stop end of a moving stroke; and
   a bracket fixed to the headrest body through a headrest frame on which the upper portions of the forward and rear swing link members are pivoted, respectively;
   wherein base portions of the link members are pivoted on the upper end of the support stay and are erected parallel to each other from the upper end of the support stay; and
   the sector of the lock mechanism is integrally formed on one of the forward and rear swing link members.

2. A headrest according to claim 1 wherein the click member is adapted to freely follow that movement of the sector which corresponds to the forward movement of the headrest body, but limit that movement of the sector which corresponds to the backward movement of the headrest body.

3. A headrest according to claim 1 wherein the click member is pivoted on the support stay together with the other swing link member which is not formed integral with the sector.

4. A headrest according to claim 3 wherein the lock mechanism further comprises a release member formed on the swing link member, to which the sector is fixed, to release the click member from the sector, and a holder means for holding the click member after the click member has been released.

5. A headrest according to claim 4 wherein the release member comprises a pushing portion formed continuous from the last one of the teeth of the sector and on the swing link member to which the sector is fixed.

6. A headrest according to claim 5 wherein the holder means is pivoted together with the other swing link member on a side opposite to the sector.

7. A headrest according to claim 6 wherein a returning means is mounted on a bracket fixed to the headrest body.